United States Patent Office 3,278,599
Patented Oct. 11, 1966

---

3,278,599
2-(BENZYLOXYALKYL)-4-PHENYLIMINO-1,3-CYCLOPENTANEDIONE DERIVATIVES
Gerhard R. Wendt, Havertown, and Kurt W. Ledig, Philadelphia, Pa., assignors to American Home Products Corporation, New York, N.Y., a corporation of Delaware
No Drawing. Filed Mar. 13, 1964, Ser. No. 351,816
2 Claims. (Cl. 260—566)

This invention is concerned with novel 2-benzyloxyalkyl-4-phenylimino-1,3-cyclopentanediones having antibacterial activity, and with intermediates occurring in their synthesis.

The claimed compounds have the following general formula:

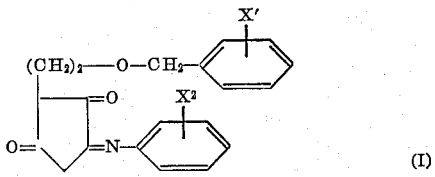

wherein $X'$ is hydrogen, lower alkyl, lower alkoxy, halogen, halo(lower)alkyl or nitro; $X^2$ is hydrogen, lower alkyl, lower alkoxy, halogen, halo(lower)alkyl, nitro or carboxy. It is intended that $X'$ and $X^2$ may be in the o-, m-, or p-positions.

Preferred compounds are those in which $X'$ and $X^2$ are hydrogen.

The claimed intermediates which are first formed in the synthesis of the above compounds are 3-(2-benzyloxyalkyl)-1,2,4-cyclopentanetriones having the formula:

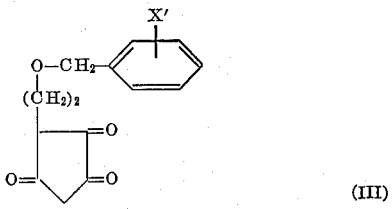

where $X'$ is as above defined.

The claimed compounds are prepared as shown below by reacting a 5-benzyloxy-2-pentanone (II), the synthesis of which is given hereinafter, with ethyl oxalate to form a 3-(2-benzyloxyalkyl)-1,2,4-cyclopentanetrione (III).

This reaction is carried out under anhydrous conditions in the presence of a basic condensation agent such as, for example, but without limitation, sodium methylate. The initial mixing of the reactants takes place below room temperature; following which, the reaction mixture is refluxed for over an hour, acidified, and again refluxed for over 2 hours. The reaction mixture is neutralized with base and the resulting salt is filtered off. The filtrate containing the 3-(2-benzyloxyalkyl)-1,2,4-cyclopentanetrione (III) is treated with an anilino compound (IV) in acid medium. The reaction mass then is diluted with water to precipitate the product (I).

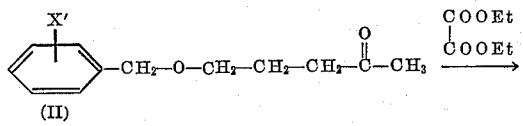

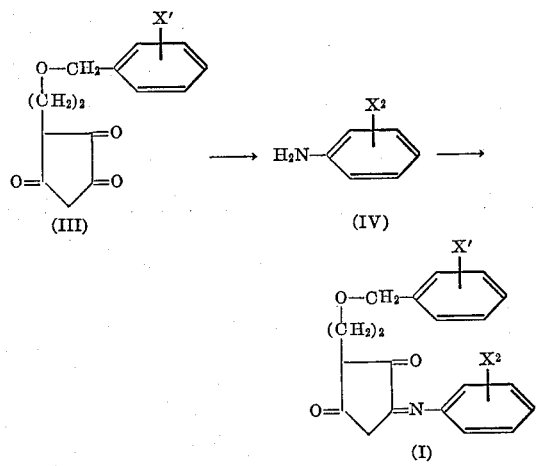

The starting 5-benzyloxy-2-pentanone (II) is prepared by reacting in ether methyl magnesium bromide with a 4-benzyloxybutyronitrile. This reaction preferably is carried out at the reflux temperature of the reaction mass for over two hours. Following this reaction time, the mixture is poured into ice water and acidified. An organic layer thereupon forms, which is washed and dried to yield an oil mixed with solvent. Distillation of the solvent yields the required starting material.

The following specific examples serve to illustrate but are not intended to limit the scope of the present invention.

EXAMPLE I

*Preparation of 5-benzyloxy-2-pentanone*

To 180 ml. of a 3 molar solution of methyl magnesium bromide in either, was added, while stirring and refluxing, a solution of 48.0 g. of 4-benzyloxybutyronitrile as prepared by the method of G. M. Bennett and A. L. Hock, J. Chem. Soc. 472 (1927), in 50 ml. of ether over a period of 30 minutes.

The reaction mixture was refluxed for another 2 hours, poured into ice-water and made acidic with 2 N sulfuric acid. The organic layer was separated, washed with a saturated sodium bicarbonate solution and dried. The oil obtained on evaporation of the solvent was distilled, affording the title compound, B.P. 104–107° (0.1 mm.). IR 5.83μ. (Found: C, 74.76; H, 8.62. $C_{12}H_{16}O_2$ requires: C, 74.97; H, 8.39%.)

EXAMPLE 2

*Preparation of 2-(2-benzyloxyethyl)-4-phenylimino-1,3-cyclopentanedione*

To a suspension of 418 ml. of abs. alcohol and 46.8 g. of sodium methylate was added at −5° a solution of 138 g. of ethyl oxalate and 83 g. of 5-benzyloxy-2-pentanone while stirring. After the addition, the reaction mixture was refluxed for 1.5 hours, acidified with 4 N sulfuric acid and then refluxed for another 2.5 hours. The reaction mixture was adjusted to pH 7 with 50% sodium hydroxide and the salt filtered off. The filtrate containing 3 - (2 - benzyloxyethyl) - 1,2,4 - cyclopentanetrione was treated with 50 ml. of 2 N hydrochloric acid and 120 ml. of aniline, followed by the addition of 700 ml. of water, and the resulting precipitate filtered and triturated with methanol. Recrystallization from alcohol afforded the pure compound; M.P. 124–126°. When tested pharmacologically, this compound was found to have activity against *Brucella bronchiseptica*.

EXAMPLE 3

*Preparation of 2-(2-p-chlorobenzyloxyethyl)-4-(p-carboxyphenylimino)-1,3-cyclopentanedione*

Using 5 - (p - chlorobenzyloxy) - 2 - pentanone in place of 5 - benzyloxy - 2 - pentanone and p - aminobenzoic acid in place of aniline but otherwise carrying out the reaction as described in the previous example, the title compound is obtained.

When applying the above procedure to the starting compounds listed below the products hereinafter listed are obtained:

| Starting Materials | Products |
| --- | --- |
| 5-(m-Methoxybenzyloxy)-2-pentanone and p-nitroaniline. | 3-(2-m-Methoxybenzyloxyethyl)-1,2,4-cyclopentanetrione; 2-(2-m-Methoxybenzyloxyethyl)-4-(p-nitrophenylimino)-1,3-cyclopentanedione. |
| 5-(o-Butoxybenzyloxy)-2-pentanone and m-dichloromethylaniline. | 3-(2-o-Butoxybenzyloxyethyl)-1,2,4-cyclopentanetrione; 2-(2-o-Butoxybenzyloxyethyl)-4-(m-dichloromethylphenylimino)-1,3-cyclopentanedione. |
| 5-(p-Trifluoromethylbenzyloxy)-2-pentanone and p-bromoaniline. | 3-(2-p-Trifluoromethylbenzyloxyethyl)-1,2,4-cyclopentanetrione; 2-(2-p-Trifluoromethylbenzyloxyethyl)-4-(p-bromophenylimino)-1,3-cyclopentanedione. |
| 5-(o-Butylbenzyloxy)-2-pentanone and o-butylaniline. | 3-(2-o-Butylbenzyloxyethyl)-1,2,4-cyclopentanetrione; 2-(2-o-Butylbenzyloxyethyl)-4-(o-butylphenylimino)-1,3-cyclopentanedione. |
| 5-(p-Methylbenzyloxy)-2-pentanone and p-methoxyaniline. | 3-(2-p-Methylbenzyloxyethyl)-1,2,4-cyclopentanetrione; 2-(2-p-Methylbenzyloxyethyl)-4-(p-methoxyphenylimino)-1,3-cyclopentanedione. |
| 5-(p-Nitrobenzyloxy)-2-pentanone and p-butoxyaniline. | 3-(2-p-Nitrobenzyloxyethyl)-1,2,4-cyclopentanetrione; 2-(2-p-Nitrobenzyloxyethyl)-4-(p-butoxyphenylimino)-1,3-cyclopentanedione. |
| 5-(o-Ethylbenzyloxy)-2-pentanone and p-tolylaniline. | 3-(2-o-Ethylbenzyloxyethyl)-1,2,4-cyclopentanetrione; 2-(2-o-Ethylbenzyloxyethyl)-4-(p-tolylphenylimino)-1,3-cyclopentanedione. |

The compounds of this invention can be administered with pharmaceutically acceptable inert carriers in a wide variety of oral or parenteral unit dosage forms containing 25, 100, 250 or 500 mg. of the active ingredients for the symptomatic adjustment of the dosage, or in admixture with other active compounds.

The present invention also includes the process of bringing the compounds thereof into a form suitable for therapeutic administration by associating them with liquid or solid, pharmaceutically acceptable carriers.

What is claimed is:

1. A compound of the formula:

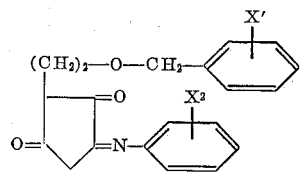

wherein X′ is selected from the group consisting of hydrogen, lower alkyl, lower alkoxy, chloro, bromo, dichloromethyl, trifluoromethyl and nitro and $X^2$ is selected from the group consisting of hydrogen, lower alkyl, lower alkoxy, halogen, halo(lower)alkyl, nitro and carboxy.

2. 2 - (2 - benzyloxyethyl) - 4 - phenylimino - 1,3-cyclopentanedione.

No references cited.

CHARLES B. PARKER, *Primary Examiner.*

ROBERT V. HINES, *Assistant Examiner.*